United States Patent [19]

Das

[11] Patent Number: 5,236,013
[45] Date of Patent: Aug. 17, 1993

[54] DIP PIPE APPARATUS

[75] Inventor: Dilip K. Das, Baton Rouge, La.

[73] Assignee: Ciba-Geigy Corporation, Ardsley, N.Y.

[21] Appl. No.: 981,453

[22] Filed: Nov. 25, 1992

[51] Int. Cl.$^5$ .............................................. B01D 11/00
[52] U.S. Cl. .................................... 137/592; 422/283
[58] Field of Search ................. 137/590, 592; 422/283

[56] References Cited

U.S. PATENT DOCUMENTS

| | | | |
|---|---|---|---|
| 3,342,193 | 9/1967 | Deering et al. | 137/592 X |
| 4,461,743 | 7/1984 | Chowdhury et al. | 137/592 X |
| 4,848,387 | 7/1989 | Hon | 137/592 X |

OTHER PUBLICATIONS

Resistoflex Company (Brochure), Reaction Vessel Components (1981), pp. 1-8.

Primary Examiner—John Rivell
Attorney, Agent, or Firm—William A. Teoli, Jr.

[57] ABSTRACT

A dip pipe apparatus is disclosed which comprises in combination: first (inner) and second (outer) tubular pipes having about parallel longitudinal axes; the second (outer) pipe having upper and lower pipe portions and means for connecting the same, wherein the diameter of the upper pipe portion is greater than the diameter of the lower pipe portion; the first (inner) pipe being delimited by a first outlet for liquids within the upper portion of the second pipe, which first pipe is defined by a diameter less than the diameter of the lower portion of the second pipe; a second outlet for the subsurface addition of liquids to a reaction mass in the lower pipe portion of the second pipe; and a means for venting gases displaced by the flow of liquids within said apparatus.

17 Claims, 1 Drawing Sheet

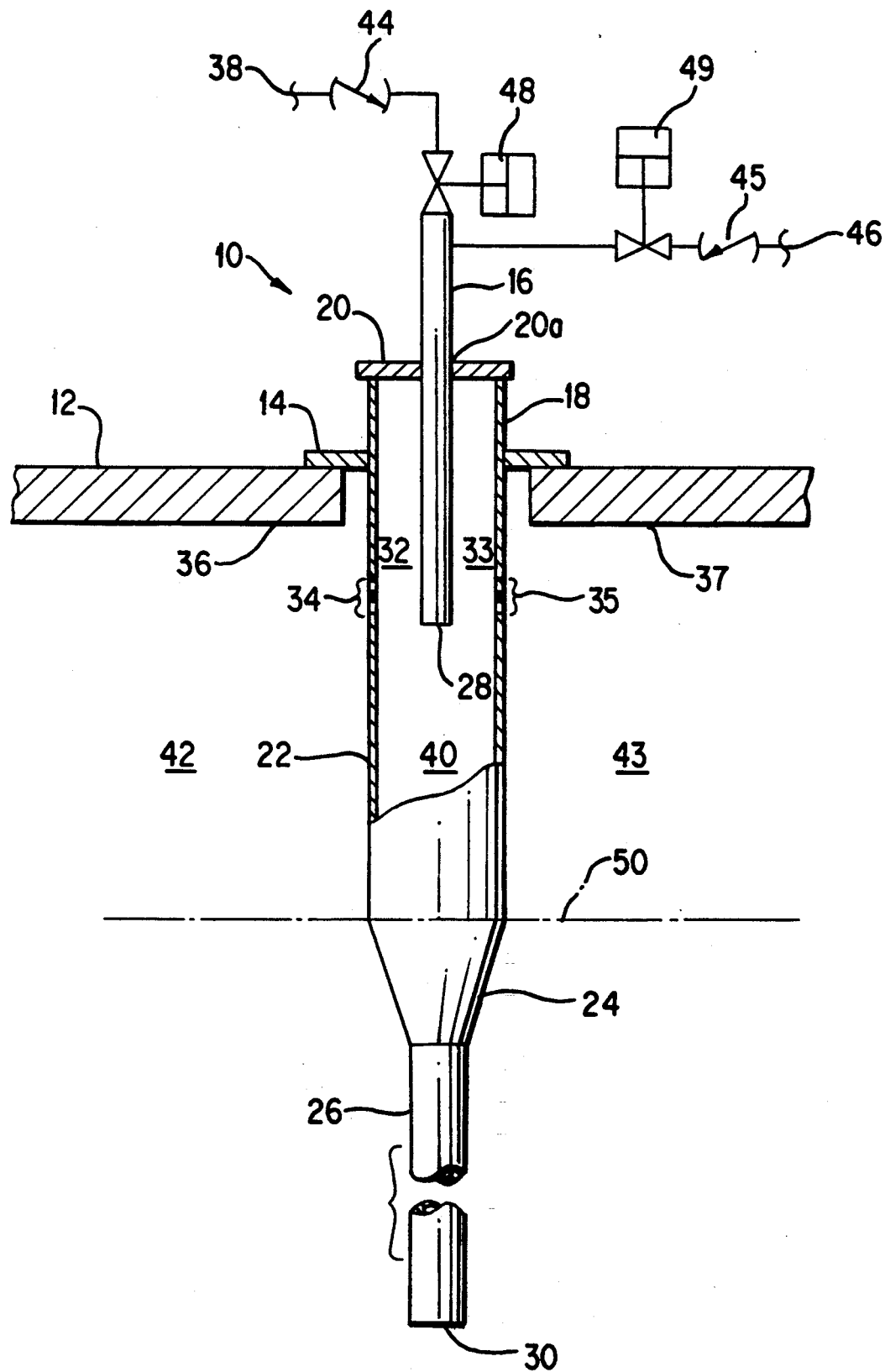

DIP PIPE APPARATUS

TECHNICAL FIELD

The present invention relates generally to a dip pipe apparatus for loading, unloading or decanting a reaction vessel. More particularly, it relates to that type of dip pipe which is particularly adapted for adding a liquid to a reactor below liquid level.

BACKGROUND OF THE INVENTION

Diazotization reactions have been known for over a century and have been applied in a large scale in the manufacture of organic products, particularly in the manufacture of dyes, medicines, or intermediate products thereof. In particular, diazotizations and couplings are the chemical foundation of the azo dye industry. Production of azo dyes on an industrial scale is usually carried out batchwise in an aqueous medium. A sodium nitrite ($NaNO_2$) solution and a mineral acid, such as muriatic acid or dilute sulfuric acid, are used for diazotization in a majority of cases. In this regard, it often is advantageous to add sodium nitrite to the reaction below liquid level via a dip pipe.

It has long been recognized that diazotization is a complex reaction involving the formation of several active nitrosating species, as well as nitrogen oxides. However, the formation of unacceptable levels of nitrogen oxides during the diazotization may require that the addition of sodium nitrite be stopped to prevent discharge of the oxides to the atmosphere. High concentrations of nitrogen oxides in the vent system also may lead to fires or explosions if any organic material has been deposited in the system during previous charging operations.

Prior to the present invention, dip pipes with anti-syphon holes used for the subsurface addition of sodium nitrite in diazotization reactors have not completely assured the prevention of reactor backflow. Furthermore, conventional dip pipes tend to spray sodium nitrite through the anti-syphon holes and thereby promote the formation of nitrogen oxides. In this instance, a flow reversal, consequential cross contamination, and a possible explosion can not be ruled out.

Accordingly, there continues to be a need for an improved dip pipe which can be used for the subsurface addition of a sodium nitrite solution in a diazotization process without promoting the formation of nitrogen oxides.

SUMMARY OF THE INVENTION

The present invention relates to the discovery that the problems associated with conventional dip pipes can be addressed by providing a dip pipe apparatus that has no hard pipe continuity between the source chemicals and the reaction mass. In other words, the liquid flow path between the source chemicals and the reaction mass is broken by providing a plurality of pipes or pipe segments having different diameters so that the liquid flow path to the reaction mass becomes the path of least resistance. In this way, the formation of unacceptable levels of nitrogen oxides in a diazotization process can be minimized. The apparatus has application in loading, unloading or decanting a reaction vessel and, in particular, for the addition of liquids such as source chemicals or solvents to a reaction mass below liquid level. The apparatus is particularly suited for the subsurface addition of a sodium nitrite solution in a diazotization process and is effective to reduce or eliminate unacceptable nitrogen oxide formation and reactor backflow.

In accordance with one aspect of the present invention, there is provided a dip pipe apparatus comprising in combination: first (inner) and second (outer) tubular pipes having about parallel longitudinal axes; the second (outer) pipe having upper and lower pipe portions and means for connecting the same, wherein the diameter of the upper pipe portion is greater than the diameter of the lower pipe portion; the first (inner) pipe being delimited by a first outlet for liquids within the upper portion of the second pipe, which first pipe is defined by a diameter less than the diameter of the lower portion of the second pipe; a second outlet for the subsurface addition of liquids to a reaction mass in the lower pipe portion of the second pipe; and a means for venting gases displaced by the flow of liquids within said apparatus.

The invention will be better understood after reading the following detailed description of the presently preferred embodiments thereof with reference to the appended drawing.

BRIEF DESCRIPTION OF THE DRAWING

The single drawing FIGURE is a schematic illustration of an embodiment of a dip pipe apparatus according to the present invention.

DESCRIPTION OF THE PRESENTLY PREFERRED EMBODIMENT

Referring now to the drawing FIGURE, which is a schematic view of an illustrative, but non-limiting embodiment of a dip pipe apparatus useful in the practice of the invention, a dip pipe apparatus 10 is shown sealably (liquid/vapor tight) connected to a reactor vessel 12 via flange 14 and a gasket (not shown). The apparatus 10 is formed from a plurality of pipes including a first tubular pipe 16 and a second tubular pipe 18. The materials used for constructing the dip pipe apparatus 10 will depend upon the desired reaction and corresponding requirements regarding corrosion resistance and ability to withstand compressive, tensile and thermal stress. By way of example, specific materials include iron, stainless steel, nickel and high-nickel alloys, titanium, copper, aluminum, rubber-coated steel (with or without an acid-proof lining), enamelled steel, glass fiber reinforced synthetic resins, and wood. In addition, various parts may contain or be constructed from polytetrafluoroethylene (e.g., TEFLON®).

The first (inner) pipe 16 is sealably connected (liquid/vapor tight) to the second pipe 18 via flange 20 at an inlet port 20a and comprises the lower end of an upstream side pipe section of the apparatus for dispensing liquids into the second tubular pipe. The first pipe 16 is defined by a first internal diameter $d_1$ which, in one embodiment, is sized for a liquid flow velocity of from about 1 to about 3 meters per second.

The second (outer) pipe 18 has upper, middle and lower portions, 22, 24 and 26, respectively. The second pipe 18 is defined by a second internal diameter which is "discontinuous" or non-uniform. More specifically, the internal diameter $d_{2U}$ of the upper portion 22 is greater than the internal diameter $d_{2L}$ of the lower portion or dip leg 26. The middle portion or reducer 24 connects the upper and lower portions and, therefore, has a maximum internal diameter about equal to $d_{2U}$ and a minimum internal diameter about equal to $d_{2L}$.

A portion of the first pipe 16 is disposed within the upper portion 22 of the second pipe and is delimited by a first outlet 28 at a position spaced above the middle portion 24 of the second pipe. Typically, the internal diameter $d_1$ of the first pipe 16 is less than the internal diameter $d_{2L}$ of the dip leg 26 to facilitate gravity flow through the second outlet 30 which is disposed at the lower end of the dip leg 26 and, in operation, is below liquid level.

In general, the internal diameter ratio between the upper portion 22 and the dip leg 26 ($d_{2U}:d_{2L}$) ranges from about 1.25:1 to about 2:1, more often from about 1.25:1 to about 1.5:1, depending upon the viscosity and flow velocity of the liquid stream. For liquid streams of relatively low viscosity (i.e., less than about 100 centipoise at 25° C.), the optimal diameter $d_{2L}$ of the dip leg 26 can be estimated from the relationship:

$$d_{2L} = (V^2/F^2)(1/g)$$

where V is the flow velocity of the source liquid stream in the first pipe, g is the acceleration due to gravity and F is the Froude number. Generally and preferably, the Froude number of the dip leg 26 should be less than about 0.50, more often less than about 0.40, and, for diazotization purposes, less than about 0.31, in order to reduce or prevent an aspirating effect within the apparatus.

The optimal internal diameter $d_{2L}$ (millimeters) for the dip leg 26 also can be estimated from the following equation:

$$d_{2L} = 1118(G')^{0.4}$$

where G' is the flow rate of source liquids (m³/s) in the first pipe 16.

Likewise, for British units, the optimal internal diameter $d_{2L}$ (inches) for the dip leg 26 can be estimated from the following equation:

$$d_{2L} = 0.92(G)^{0.4}$$

where G is the flow rate of source liquids (gallons/minute) in the first pipe 16.

In one embodiment, the internal diameter $d_{2U}$ of the upper portion 22 is about 102 mm (4 inches) and the internal diameter $d_{2L}$ of the dip leg 26 is about 75 millimeters (3 inches). In general, the length of the dip leg 26 varies with the size of the reactor vessel 12 and the reaction mass contained therein.

Returning now to the drawing, the upper pipe portion 22 contains a means for venting gases that are displaced by the flow of liquids within the apparatus in order to reduce backflow. It will be understood that the venting includes both the inflow and outflow of gases within the apparatus. In one embodiment, the vent means includes a venting path (32,33) and a plurality of anti-syphon holes (34,35), also called "weep holes".

The venting path (32,33) for gases displaced by the flow of liquids is interconnected in gas transfer relationship with the weep holes (34,35) and is defined by a circumferentially and axially extending space which exists between the outer surface of the first tubular pipe 16 and the inner surface of the second tubular pipe 18.

The weep holes (34,35) are defined by perforations spaced along the circumference of at least one cylindrical section of the upper portion 22. In the illustrated embodiment, two cylindrical sections of the upper portion 22 are each perforated with 4 equispaced holes, for a total of 8. In one embodiment, the holes have a diameter of about 6.35 millimeters (¼ inch). The total area defined by the holes should be sufficient to vent the displaced gases from the apparatus, but be smaller than the cross-sectional area of the dip leg 26 so that the flow path within the dip leg is always the path of least resistance for the source liquids. In general, the weep holes (34,35) are spaced above the first outlet 28 and spaced from the inner wall of the reactor (36,37) to allow a clear path for venting gases and for pressure equilibration.

In one embodiment, the minimum number of weep holes is 2 (based on 6.35 mm holes and a displaced vapor velocity through the holes of 20.3 m/s).

The number of weep holes (n) of 6.35 mm (¼ inch) diameter (rounded to the nearest higher integer) can be estimated by the following equation:

$$n = (1585)G' = (0.1)G$$

where G' is the flow rate of the liquids in the second pipe (m³/s) and G is the flow rate of the liquids in the second pipe in gallons per minute (gpm). For example, if $G' = 1.58 \times 10^{-3}$, then n=2.5; use three (3) 6.35 mm vent holes (round n to the nearest higher integer). Likewise, if G=10 gpm, then n=1; use the minimum of two (2) ¼" vent holes.

In operation, the apparatus 10 is connected to an upstream liquid source 38 (e.g., chemical or solvent). The liquids flow through the first pipe 16, out the first outlet 28 and into the free volume 40 of the dip pipe apparatus 10. Subsurface addition of the liquid stream is effected essentially by gravity and momentum of the liquids, which enters the reaction mass via the second outlet 30. Any gases which are displaced by the liquid flow are vented through the venting path (32,33) and the weep holes (34,35). As the liquids flow through the apparatus, a superincumbent pressure between the interior of the apparatus and the reactor interior (42,43) is created as gases (e.g., air and other vapors) are drawn through the weep holes (34,35). This pressure differential facilitates subsurface addition of the source liquids and reduces the incidence of backflow. Should backflow of the reaction mass occur, pressure between the interior of the apparatus 10 and the reactor interior (42,43) tends to equilibrate via the weep holes (34,35). This is generally sufficient to prevent uncontrolled backflow. In the illustrated embodiment, two check valves (44,45) provide secondary means of reducing backflow. Optionally, a water flush 46, used to clean the dip pipe at the end of batch transfer, and air-operated ON/OFF valves (48,49) (for the automation of the process) constitute a part of the apparatus.

The illustrated dip pipe apparatus has been found to perform very effectively in a diazotization process with the upper and middle portions (22,24) of the second pipe 18 being above the highest liquid level in the reactor vessel 12. Other dimensions are as follows: The distance between the weep holes (34,35) (lowest) and the lower tangent line 50 of the upper portion 22 is about 375 mm (15"). The first outlet 28 is spaced about 25 mm (1") below the weep holes (34,35) (lowest). The weep holes (34,35) (highest) should clear the reactor inner wall (36,37) by about 25 mm (1").

Having described the presently preferred embodiments of the invention, it will be understood that numerous changes may be made without departing from the true scope of the invention which is only defined by the following claims.

What is claimed is:

1. A dip pipe apparatus comprising in combination:
first (inner) and second (outer) tubular pipes having about parallel longitudinal axes; the second (outer) pipe having upper and lower pipe portions and means for connecting the same, wherein the diameter of the upper pipe portion is greater than the diameter of the lower pipe portion; the first (inner) pipe being delimited by a first outlet for source liquids within the upper portion of the second pipe, which first pipe is defined by a diameter less than the diameter of the lower portion of the second pipe; a second outlet for the subsurface addition of liquids to a reaction mass in the lower pipe portion of the second pipe; and a means for venting gases displaced by the flow of liquids within said apparatus.

2. A dip pipe apparatus for the subsurface addition of a source liquid stream into a reaction mass, which apparatus contains a plurality of pipes for dispensing the liquids into a reactor containing the reaction mass, said apparatus comprising:
first (inner) and second (outer) tubular pipes having about parallel longitudinal axes, and wherein said first pipe is defined by an internal diameter $d_1$;
said second tubular pipe having a wall defining inner and outer surfaces of said pipe, and having upper, middle and lower pipe portions,
said upper pipe portion defined by an internal diameter $d_{2U}$ and comprising weep hole means for venting gases displaced by the flow of liquids within the apparatus, and an inlet port at an upper end of said upper portion,
said lower pipe portion defined by an internal diameter $d_{2L}$ wherein $d_{2U} > d_{2L}$, and wherein said lower pipe terminates in an outlet adapted for the subsurface addition of said liquids into the reaction mass, and
said middle pipe portion comprising a tapered reducer defined by a minimum internal diameter that is approximately equal to $d_{2L}$ and a maximum internal diameter that is approximately equal to $d_{2U}$ and is adapted to connect said upper and lower pipe portions,
said first tubular pipe having a wall defining inner and outer surfaces of said pipe and wherein the internal diameter $d_1$ is less than $d_{2L}$, which first pipe comprises the lower end of an upstream side pipe section of said apparatus for dispensing liquids into said second tubular pipe and is sealably connected to said second pipe at the inlet port thereof, and wherein a portion of the first pipe is disposed within the upper pipe portion of said second pipe and is delimited by an outlet at a position spaced below said weep hole means and above said middle portion; and
a venting path for gases displaced by the flow of liquids within the apparatus, which venting path is interconnected in gas transfer relationship with said weep hole means and is defined by a circumferentially and axially extending space which exists between the outer surface of said first tubular pipe and the inner surface of said second tubular pipe.

3. An apparatus according to claim 2 wherein $d_{2L}$ is estimated from the following equation:

$$d_{2L} = (V^2/F^2)(1/g)$$

where V is the flow velocity of the liquids in said first pipe, g is the acceleration due to gravity and F is the Froude number.

4. An apparatus according to claim 3 wherein said Froude number is less than about 0.50.

5. An apparatus according to claim 4 wherein said Froude number is less than about 0.31.

6. An apparatus according to claim 2 wherein the optimal internal diameter $d_{2L}$ is estimated from the following equations:

$$d_{2L}(\text{mm}) = 1118(G')^{0.4}$$

$$d_{2L}(\text{in}) = 0.92(G)^{0.4}$$

where $G'$ is the flow rate of liquids ($m^3/s$) in the first pipe and G is the flow rate of liquids (gallons/minute) in the first pipe.

7. An apparatus according to claim 2 wherein said weep hole means for venting vapor displaced by the flow of source liquids within said first pipe comprises, at least one cylindrical section of the upper pipe portion of said first pipe which is perforated by a plurality of weep holes spaced along the circumference of said cylindrical section.

8. An apparatus according to claim 7 wherein the total number (n) of 6.35 mm weep holes is estimated by the formula:

$$n = (1585)G'$$

where $G'$ is the flow rate of liquids ($m^3/s$) in the second pipe and n is rounded to the nearest higher integer.

9. An apparatus according to claim 7 wherein the total number (n) of ¼ inch weep holes is estimated by the formula:

$$n = (0.1)G$$

wherein G is the flow rate of liquids (gallons/minute) in the second pipe and n is rounded to the nearest higher integer.

10. An apparatus according to claim 2 wherein a portion of the first pipe is centrally disposed within the upper pipe portion of said second pipe.

11. An apparatus according to claim 2 wherein a portion of the first pipe is about coaxially disposed within the upper pipe portion of said second pipe.

12. An apparatus according to claim 2 wherein the diameter ratio between the upper portion and the lower portion of the second pipe ($d_{2U}:d_{2L}$) ranges from about 1.25:1 to about 2:1.

13. An apparatus according to claim 12 wherein the ratio ($d_{2U}:d_{2L}$) ranges from about 1.25:1 to about 1.5:1.

14. An apparatus according to claim 1 wherein said source liquids comprise a sodium nitrite solution.

15. An apparatus according to claim 2 wherein said source liquids comprise a sodium nitrite solution.

16. A process of adding a source liquid to a reactor below the level of a reaction mass contained therein which comprises adding the source liquid to the reactor with a dip pipe apparatus comprising in combination:
first (inner) and second (outer) tubular pipes having about parallel longitudinal axes; the second (outer) pipe having upper and lower pipe portions and means for connecting the same, wherein the diameter of the upper pipe portion is greater than the diameter of the lower pipe portion; the first (inner) pipe being delimited by a first outlet for the source liquids within the upper portion of the second pipe, which first pipe is defined by a diameter less than the diameter of the lower portion of the second pipe; a second outlet for the subsurface addition of liquids to a reaction mass in the lower pipe portion of the second pipe; and a means for venting gases displaced by the flow of liquids within said apparatus.

17. A process according to claim 16 wherein said dip pipe apparatus comprises:

first (inner) and second (outer) tubular pipes having about parallel longitudinal axes, and wherein said first pipe is defined by an internal diameter $d_1$;

said second tubular pipe having a wall defining inner and outer surfaces of said pipe, and having upper, middle and lower pipe portions, said upper pipe portion defined by an internal diameter $d_{2U}$ and comprising weep hole means for venting gases displaced by the flow of liquids within the apparatus, and an inlet port at an upper end of said upper portion, said lower pipe portion defined by an internal diameter $d_{2L}$ wherein $d_{2U} > d_{2L}$, and wherein said lower pipe terminates in an outlet adapted for the subsurface addition of said liquids into the reaction mass, and said middle pipe portion comprising a tapered reducer defined by a minimum internal diameter that is approximately equal to $d_{2L}$ and a maximum internal diameter that is approximately equal to $d_{2U}$ and is adapted to connect said upper and lower pipe portions, said first tubular pipe having a wall defining inner and outer surfaces of said pipe and wherein the internal diameter $d_1$ is less than $d_{2L}$, which first pipe comprises the lower end of an upstream side pipe section of said apparatus for dispensing liquids into said second tubular pipe and is sealably connected to said second pipe at the inlet port thereof, and wherein a portion of the first pipe is disposed within the upper pipe portion of said second pipe and is delimited by an outlet at a position spaced below said weep hole means and above said middle portion; and a venting path for gases displaced by the flow of liquids within the apparatus, which venting path is interconnected in gas transfer relationship with said weep hole means and is defined by a circumferentially and axially extending space which exists between the outer surface of said first tubular pipe and the inner surface of said second tubular pipe.

* * * * *